July 11, 1939.  C. M. MacCHESNEY  2,165,283
CONVEYER BELT
Filed June 25, 1936   2 Sheets-Sheet 1

Inventor:
Chester M. MacChesney
By Davis, Lindsey, Smith & Shonts, Attys.

July 11, 1939.　　C. M. MacCHESNEY　　2,165,283
CONVEYER BELT
Filed June 25, 1936　　2 Sheets-Sheet 2
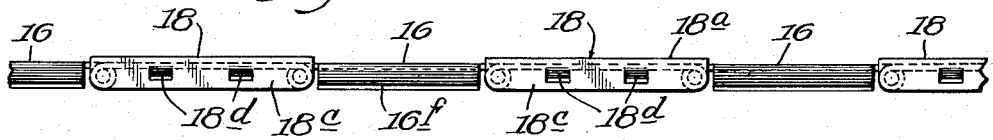
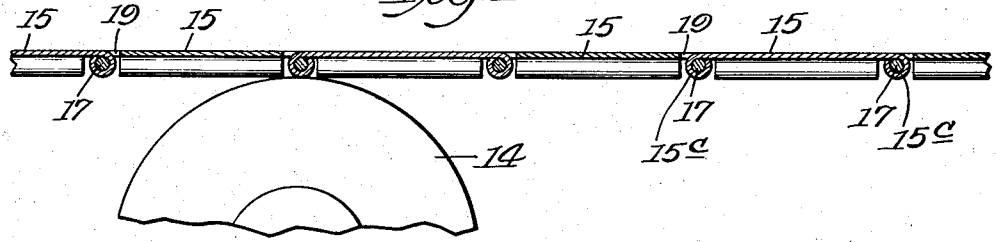
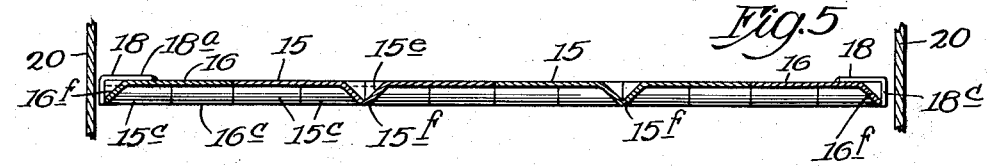
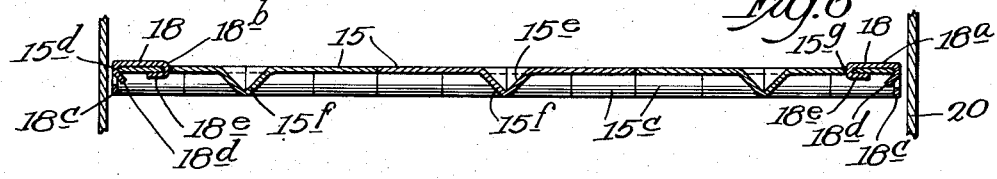
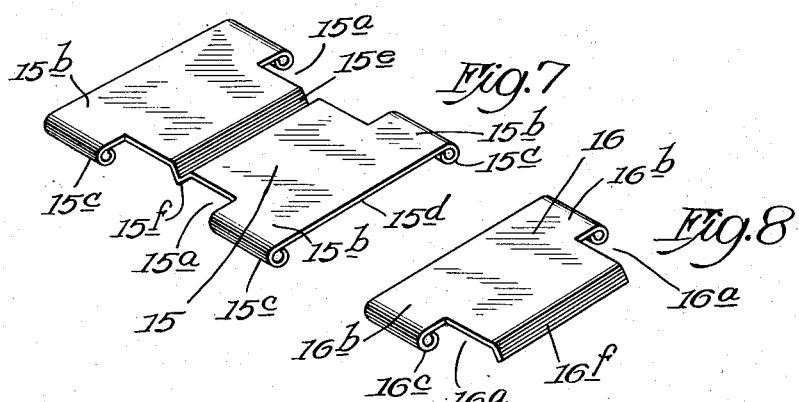
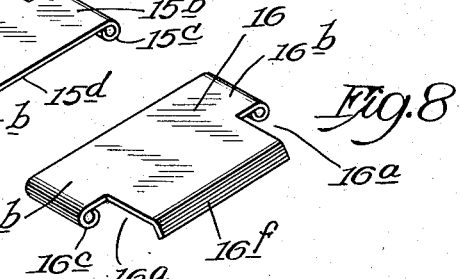
Inventor:
Chester M. MacChesney
By Davis, Lindsey, Smith & Shonts　Attys.

Patented July 11, 1939

2,165,283

UNITED STATES PATENT OFFICE 2,165,283

CONVEYER BELT

Chester M. MacChesney, Chicago, Ill., assignor to Acme Steel Company, Chicago, Ill., a corporation of Illinois Application June 25, 1936, Serial No. 87,141

7 Claims. (Cl. 198—189)

This invention relates to improvements in conveyer belts and its purpose is to provide an improved endless belt formed of metal parts adapted for use in conveying loose materials from one location to another. The principal object of the invention is to provide an improved metallic conveyer belt formed of pivotally connected parts which provide a substantially continuous conveying surface throughout the area of the belt. Another object of the invention is to provide a conveyer belt formed of a plurality of series of metal plates, the plates of each series intermeshing with and being pivotally connected to the plates of two adjacent series, whereby an endless belt is provided having a substantially continuous conveying surface. Still another object of the invention is to provide a conveyer belt comprising a plurality of metal plates which intermesh with each other and which are pivotally connected in the region in which they intermesh so that longitudinal separation of the plates in the direction of their pivotal axes is prevented. A further object of the invention is to provide an endless metallic conveyer belt adapted to pass around pulleys or the like and made up of a plurality of pivotally connected metal plates provided with parts which are adapted to engage the pulleys between the points of pivotal connection to provide support for intervening areas of each plate between said pivotal connections. Other objects relate to various features of construction and arrangement which will appear more fully hereinafter.

The nature of the invention will be understood from the following specification and taken with the accompanying drawings in which one embodiment is illustrated.

In the drawings—

Fig. 3 shows a side elevation of the structure illustrated in Fig. 2;

Fig. 4 shows a longitudinal section taken on the line 4—4 of Fig. 2;

Fig. 5 shows a transverse section taken on the line 5—5 of Fig. 2;

Fig. 6 shows a transverse section taken on the line 6—6 of Fig. 2;

Fig. 7 shows a perspective view of one of the metal plates embodied in the conveyer belt shown in Figs. 1 to 6, inclusive, and Fig. 8 is a perspective view of one of the plates which is used along the edges of the belt to fill intervening spaces between end portions of two plates having the form shown in Fig. 7.

Figure 1:
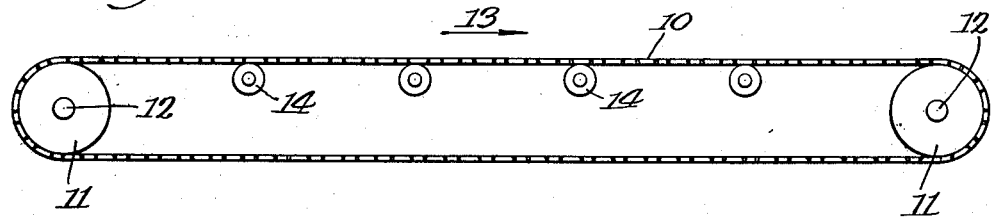
Figure 1 shows a side elevation of the improved conveyer belt mounted on supporting pulleys and intervening idler rollers.

As illustrated in Fig. 1, the improved conveyer belt 10 is shown as being mounted to extend around two pulleys or rolls 11 which are carried by shafts 12 journaled in bearings not illustrated. One of the shafts 12 is adapted to be driven by a source of power thus causing the upper stretch of the belt to travel in the direction of the arrow 13, for example, for the purpose of conveying materials which are discharged onto the belt. This upper stretch of the belt is supported by a plurality of idler rolls 14 which are supported by shafts journaled in suitable bearings. The conveyer belt, the details of which are shown more particularly in Figs. 2 to 8, inclusive, is made up primarily of a plurality of metal plates 15 which are supplemented along the edges of the belt by other plates 16, the specific construction of the plates 15 and 16 being shown in Figs. 7 and 8, respectively. These plates are connected together by pivot pins 17, each of which extends throughout the width of the belt and these pins are, in the embodiment illustrated, restrained against endwise movement by means of a series of protector plates 18 which are mounted at intervals along the edges of the belt and which do not constitute a part of the present invention, being described and claimed in the copending application of Chester M. MacChesney and Allen B. Wilson, Serial No. 181,476, filed December 24, 1937.

The belt 10 is made up of a plurality of transverse series of plates, each alternate series being made up entirely of a plurality of plates 15 while the intermediate series are made up of a series of plates 15 having one of the plates 16 at the ends thereof. The plates 15 of one transverse series are staggered in position with respect to the plates 15 of each next adjacent series in order to permit the plates of one series to intermesh with those of the adjacent series. Each plate 15 comprises a flat sheet metal member having oppositely located rectangular notches 15ᵃ extending inwardly from opposite sides thereof midway between the ends of the plates, thus forming at each end of the plate two oppositely disposed tongues 15ᵇ, each of which has its edge rolled to form a cylindrical bearing portion 15ᶜ. Between its ends 15ᵈ, each plate is provided at its middle point with a transverse depression 15ᵉ formed by a downwardly extending V-shaped rib 15ᶠ. The width of each notch 15ᵃ is such that it is adapted to be completely occupied by two of the tongues 15ᵇ carried by two adjacent plates. Thus, when two adjacent series of plates 15 are arranged side by side, in staggered relationship, the notches 15ᵃ of each plate are occupied by the tongues 15ᵇ carried by four adjacent plates and all of the plates of adjacent series are pivotally connected together by a pivot pin 17 which extends through the aligning bearing portions 15ᶜ.

Due to the staggered relationship of the plates 15 in adjacent transverse series, the ends of the plates 15 in some series project beyond the ends of the corresponding plates in other series and, in order that the spaces between these projections may be occupied so that the sides of the belt will be parallel to each other, the plates 16 are inserted in these spaces. Each plate 16 is, in form, exactly like one-half of each plate 15, being provided on opposite sides with angular notches 16ᵃ which correspond in shape and size to half portions of the notches 15ᵃ. The edge of each plate 16 between the notches 16ᵃ terminates in a downturned portion 16ᶠ which is in form like one-half, or one side wall, of one of the ribs 15ᶠ. Each plate 16 is further provided at its ends with a pair of oppositely disposed tongues 16ᵇ each of which corresponds in size to one of the tongues 15ᵇ. Each tongue 16ᵇ further terminates in a rolled bearing portion 16ᶜ which is adapted to align with an adjacent bearing portion 15ᶜ. When the plates 16 are assembled between the end portions of two adjacent plates 15 the down-turned flanges 16ᶠ are adapted to align with the edges 15ᵈ of the plates 15 in an adjacent series of plates.

Figure 2:
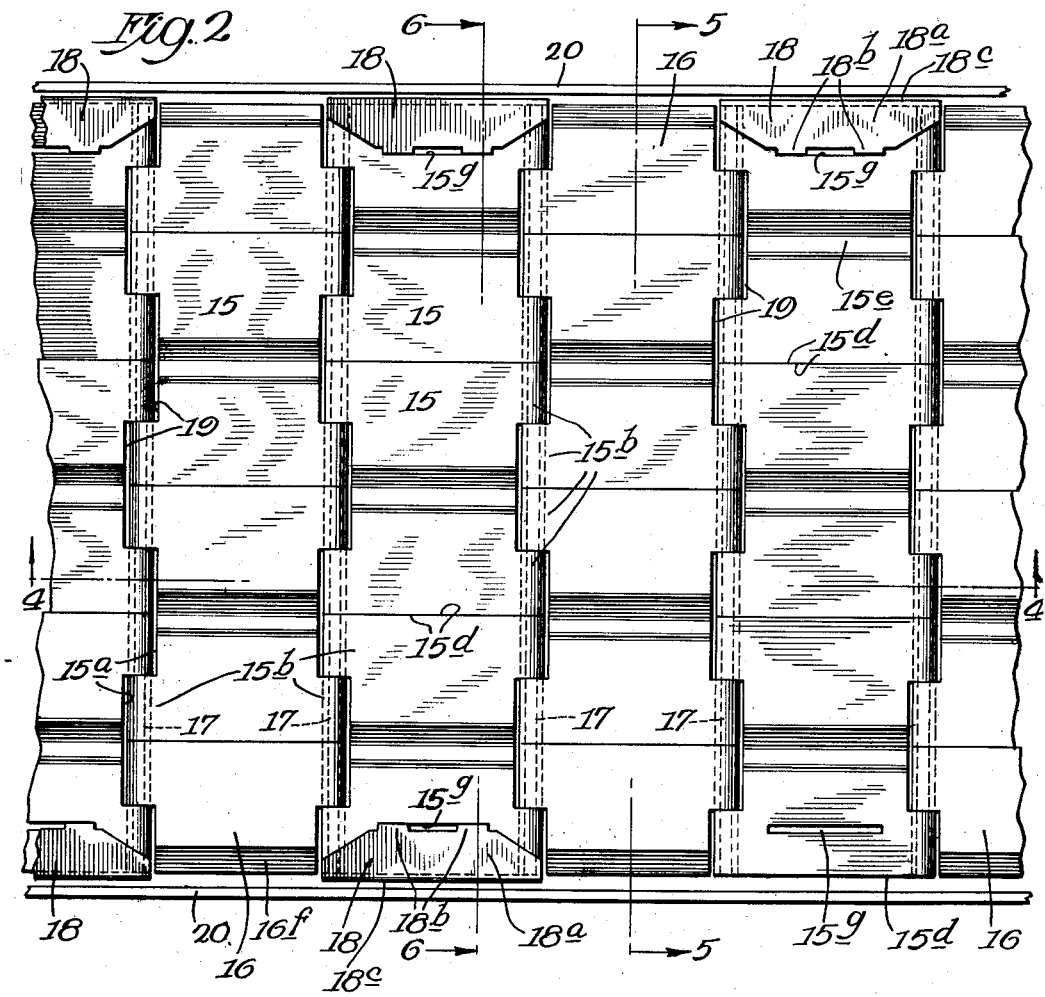
Fig. 2 shows a top plan view on an enlarged scale of a portion of the conveyer belt illustrated in Fig. 1.

Due to the fact that the major portion of each notch 15ᵃ is occupied by two of the projections 15ᵇ, or 15ᵇ and 16ᵇ, carried by adjacent plates, the upper stretch of the belt presents a substantially unbroken metallic surface, except for the relatively small elongated slots 19 which are formed between the inner margins of the notches and the adjacent edges of the bearing portions, as shown in Fig. 2. The ends 15ᵈ of adjacent plates are adapted to coact with each other and relative endwise separation of adjacent plates is prevented by reason of the fact that the tongues of adjacent plates intermesh with each other throughout the area of the belt. The ribs 15ᶠ which are formed on the plates not only strengthen them and prevent bending thereof in use, but they provide bearing portions which engage the surfaces of the rolls 11 and of the idler rolls 14 to support the plates between their pivots as they travel around the rolls. Any undesirable up and down motion of the plates upon the pulleys is thus prevented and the upper stretch of the belt has a smooth continuous travel which is adapted to retain thereon the materials being conveyed.

A belt conveyer of this type is commonly employed in conjunction with parallel side guides 20, shown in Figs. 2, 5 and 6, which extend parallel and in proximity to the lateral edges of the upper stretch of the belt. As the belt has some limited lateral motion during its longitudinal travel, these side guides are engaged from time to time by the edges of the belt and, in order to prevent damage to the edges of the metal plates of which the belt is formed and, also to prevent endwise movement of the pivot pins 18 with respect to the bearing portions of the plates in which they are mounted, the lateral edges of the belt are preferably provided with a plurality of protector plates 18, each of which is provided with a top portion 18ᵃ having a pair of tongues 18ᵇ which are adapted to extend through slots 15ᵉ formed in the plates 15 which are at the edges of the belt. Each plate 18 has a downturned flange 18ᶜ which extends transversely to the plane of the surface of the belt and which is adapted to coact with the side guides 20 during the travel of the belt, when sufficient lateral shifting of the belt takes place. These side flanges 18ᶜ are provided with inwardly bent tongues or projections 18ᵈ, shown in Fig. 6, which underlie the edges of the plates 15 on which they are mounted and, after a plate 18 has been put in place with these tongues 18ᵇ projecting beneath the plates 15, the tongues 18ᵇ which are formed on the inner edges of the plate 18 are reversely bent as shown at 18ᵉ so that the plates 18 are then held securely in place. The downturned flanges 18ᶜ of these plates 18 project over the bearing portions 15ᶜ at the edges of the belt and thus prevent the pivot pins 17 from projecting outwardly beyond these flanges.

Although one form of the invention has been shown and described by way of illustration, it will be understood that it may be constructed in various other embodiments coming within the scope of the appended claims.

I claim:

1. A conveyer belt comprising a plurality of metal plates, said plates being arranged in transverse rows with those of one row staggered with respect to those of adjacent rows, separate smaller plates filling the spaces between certain of said first named plates at the ends of alternate rows whereby the ends of all of the rows align with each other at each side of the belt, and means for pivotally connecting the first named plates and said smaller plates of adjacent rows.

2. A conveyer belt comprising a plurality of metal plates, said plates being arranged in transverse rows with those of one row staggered with respect to those of adjacent rows, separate smaller plates filling the spaces between certain of said first named plates at the ends of alternate rows whereby the ends of all of the rows align with each other at each side of the belt, said first named plates and said smaller plates having bearing sleeves formed thereon at their edges, and pins pivotally engaging said sleeves to connect adjacent rows of plates.

3. A conveyer belt comprising a plurality of metal plates each having notches on opposite sides thereof forming projecting tongues on opposite sides of each notch said plates being arranged in rows with the plates of each row staggered with respect to those of the next adjacent rows, each of said notches being adapted to receive two tongues carried by adjacent plates, and means for pivotally connecting the intermeshing tongues of plates located in adjacent rows.

4. A conveyer belt comprising a plurality of metal plates each having notches on opposite sides thereof forming projecting tongues on opposite sides of each notch, each plate being further provided with a downwardly extending rib between said notches, said plates being arranged in rows with those of one row staggered with respect to the plates of the next adjacent rows, each of said notches being adapted to receive two of said tongues carried by two plates in an adjacent row, whereby the tongues of the plates of adjacent rows intermesh with each other to prevent relative endwise separation thereof, said tongues being provided with bearing portions, and pivot pins engaging said bearing portions to form pivotal connections between adjacent rows of plates.

5. A conveyer belt comprising a plurality of metal plates, said plates being arranged in transverse rows with those of one row staggered with respect to those of adjacent rows, each of said plates having notches on opposite sides thereof forming projecting tongues on opposite sides of each notch, each of said notches being engaged and substantially filled by two projections carried by adjacent plates, a plurality of smaller plates, each formed as a half portion of one of said first named plates for filling the spaces between certain of said first named plates at the ends of certain of said rows whereby the ends of said rows align with each other at the edges of said belt, the projections of said plates having bearing portions formed thereon, and pivot pins engaging said bearing portions for pivotally connecting the plates of adjacent rows.

6. A conveyer belt comprising a plurality of metal plates, said plates being arranged in transverse rows with those of one row staggered with respect to those of adjacent rows, each of said plates having notches on opposite sides thereof forming projecting tongues on opposite sides of each notch, each of said notches being engaged and substantially filled by two projections carried by adjacent plates, a plurality of smaller plates, each formed as a half portion of one of said first named plates for filling the spaces between certain of said first named plates at the ends of certain of said rows whereby the ends of said rows align with each other at the edges of said belt, the projections of said plates having bearing portions formed thereon, and pivot pins engaging said bearing portions for pivotally connecting the plates of adjacent rows, said first named plates having transverse downwardly extending ribs between the opposite notches formed thereon, said second named plates having downturned flanges at their ends corresponding in shape to half portions of said ribs formed on said first named plates.

7. A conveyer belt comprising a plurality of sheet metal plates each having notches at opposite ends thereof forming projecting tongues on opposite sides of each notch, each of said notches being adapted to receive two tongues carried by adjacent plates, said tongues having their ends curled to form bearing sleeves, said plates being bent inwardly to form downwardly projecting ribs extending between opposite notches, and pins engaging the sleeves carried by the intermeshing tongues of adjacent rows of plates.

CHESTER M. MacCHESNEY.